No. 782,518. Patented February 14, 1905.

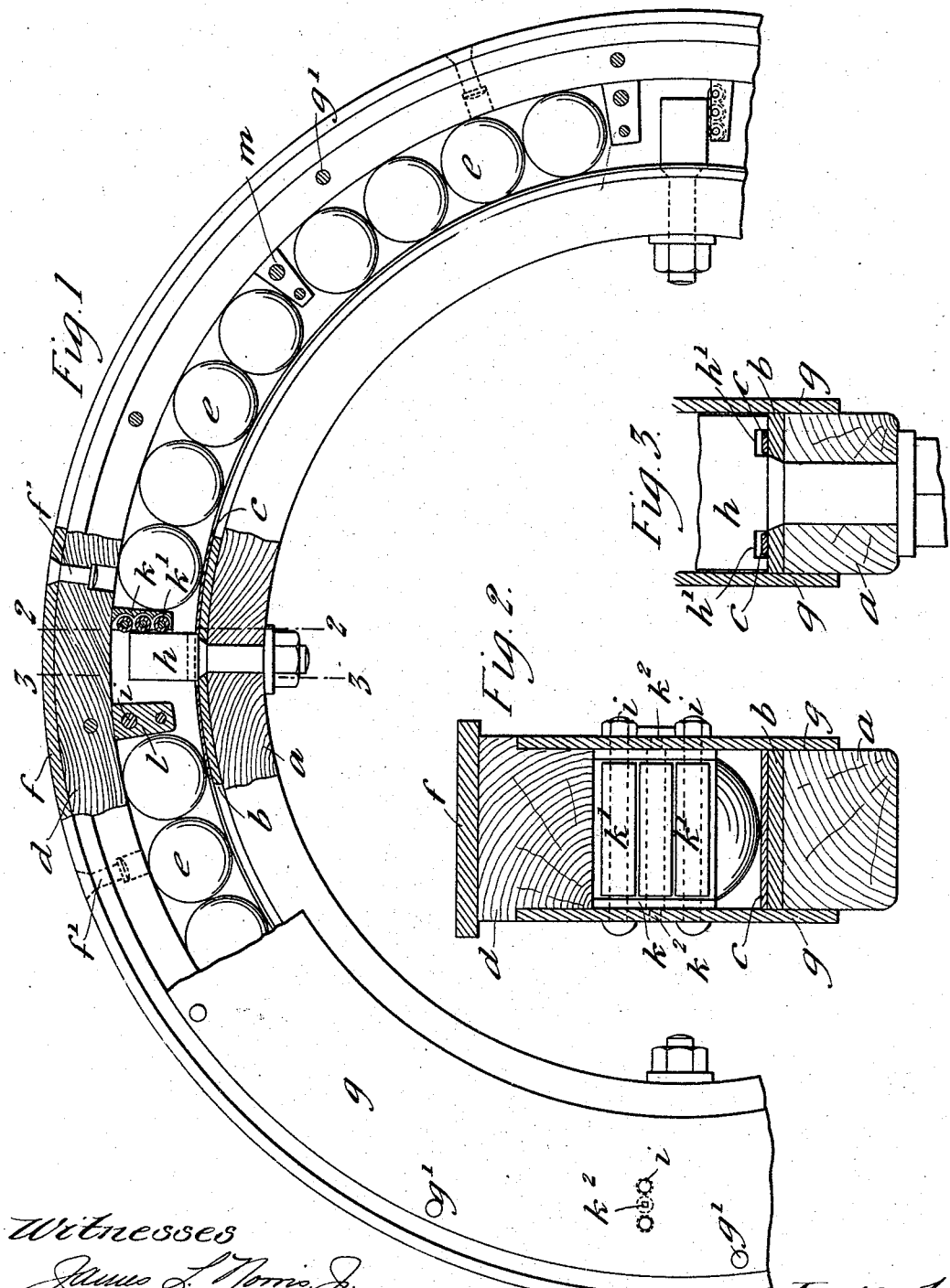

UNITED STATES PATENT OFFICE.

GLENCAIRN STUART OGILVIE, OF WOODBRIDGE, ENGLAND.

WHEEL FOR VEHICLES.

SPECIFICATION forming part of Letters Patent No. 782,518, dated February 14, 1905.

Application filed August 3, 1903. Serial No. 168,094.

*To all whom it may concern:*

Be it known that I, GLENCAIRN STUART OGILVIE, a subject of the King of Great Britain and Ireland, residing at The Lodge, Woodbridge, in the county of Suffolk, England, have invented certain new and useful Improvements in Wheels for Motor-Cars and other Vehicles, (for which I have applied for a patent in Great Britain, dated January 9, 1903, No. 631, and March 12, 1903, No. 5,764,) of which the following is a specification.

This invention relates to improvements in the construction of wheels for motor-cars and other vehicles, and is specially directed toward providing a durable tire for such wheels by the use of which a certain degree of resilience is obtained without incurring the danger of punctures, which is inseparable from the use of the ordinary pneumatic tire. For this purpose the rim and felly form separate constructions and are correlated for driving purposes, so that there is a certain relative freedom of motion both in a radial and in a circumferential direction. The rim is compounded of an outer rim of wood or other suitable material or of two or more such materials in combination, and two side rings, one on each side of the outer rim, to which they are bolted, forming a channel which embraces the felly of the wheel. Between the felly and the outer rim are a number of elastic cushions, which may consist of solid or hollow cushions of india-rubber or other elastic material or may be metal springs on which the compound rim floats, the driving being effected by means of stops fixed to or forming part of the rim and felly, respectively.

In the accompanying drawings, Figure 1 is an elevation, with part of one of the side rings removed, of part of a wheel constructed according to this invention; and Figs. 2 and 3 are sections, drawn to a larger scale, on the lines 2 2 3 3, respectively, of Fig. 1.

Referring first to Figs. 1 to 3, a wooden felly $a$, which is secured to the wheel-hub in any suitable known manner, is surmounted by a rim $b$, of iron or other suitable material, over which is freely mounted a false felly $c$, which may conveniently consist of a thin steel band formed with or without a number of projections on its outer periphery, between which and a wooden rim $d$ are interposed the elastic cushions $e$, which in this case preferably consist of solid, hollow, or cored rollers of india-rubber. The wooden rim $d$ is surmounted by an outer rim $f$, secured by rivets or bolts $f'$, which may consist of a plain band of iron or the like or may be of channel or other suitable section for the reception of a solid or hollow cushion of india-rubber or other material. Two annular rings $g$ $g$, which may alternatively be built in segments suitably secured to each other, are placed one on each side of the rim $d$, to which they are secured by bolts and nuts $g'$. The rim $d$ and outer rim $f$ may be built in corresponding sections, in which case they are put together with dovetailed joints, and may have expansion clearance, and each section is arranged to be separately removable to give access to the space occupied by the elastic cushions.

The stems of one or more lower driving-stops $h$ are passed from the outside through holes in the felly-rim and felly and secured under the latter by nuts. These stops have recesses $h'$ on the under side for clearance of the loose felly-band $c$, which is formed with clearance-slots for each lower driving-stop, each of which is at least equal in length to the maximum relative circumferential displacement possible between the rim and felly. Each lower driving-stop works between two upper driving-stops $k$ $l$, which are secured to the annular rings by transverse bolts $i$. The forward driver $k$ is preferably fitted on its driving-face with one or more antifriction-rollers $k'$, which may be mounted on the bolts $i$ in recesses in the face of the forward driver or on pins $k^2$ in such recesses formed with square ends, which are stepped in square holes in the annular rings $g$ $g$. The backward drivers $l$ and the felly-stops $h$ are preferably faced with india-rubber, leather, or equivalent material for the purpose of deadening the noise of concussion, or both rim-stops may have rollers on their driving-faces, or the felly-stops may be provided with rollers and the rim-stops faced with leather or the like.

The rollers $e$ are divided into groups by the driving-stops and may be further subdivided by spacing-stops m, which are secured to the annular rings by transverse bolts and act also as additional distance-pieces for securing parallelism between the annular rings. The outer or free ends of all stops are preferably provided with pads or cushions of india-rubber or other suitable material to lessen the possible jar between rim and felly due to relative radial displacement.

The rim-stops should project from the inner periphery of the rim d through a distance somewhat greater than half the normal depth of the elastic cushions, so as to prevent overriding of the rollers and secure direct driving and avoid undue shearing stress when driving through cushions, and the back rim-stop is so disposed that the clearance between it and the felly-stop is at least as great as the total radial clearance between rim and felly; otherwise these two parts under certain conditions would become locked before the full radial movement of the rim on the felly had been accomplished.

In the case of a driving-wheel constructed according to this invention the driving force is transmitted in forward driving through the stops $h\ k$ to the wheel-rim, and in backward driving through the stops $h\ l$. In the case of a trailing wheel the driving is of course from rim to felly, and the driving when going ahead is between the stops $l\ h$ and when going astern between the stops $k\ h$. The friction between the rollers $e$ and the loose band $c$ being considerably greater than the friction between the two iron bands $c\ b$ when relative circumferential movement takes place between rim and felly, the loose band will move with the rollers, which are therefore protected from the very great wear and tear that would occur owing to the high friction coefficient between india-rubber or the like and iron if the rollers were compressed on the fixed iron rim of the felly.

I am aware that it has been proposed to construct a wheel with an outer rim or tire separate from the felly and with balls or other elastic bodies interposed between them, and I therefore make no general claim to such a construction.

Having thus described the nature of this invention and the best means I know of carrying the same into practical effect, I claim—

1. In wheels for road and other vehicles, a tire consisting of an outer rim of wood surmounted by an iron band, two side rings fixed to the outer rim, a felly adapted to slide between the side rings, elastic cushions between the felly and the outer rim, and driving-stops on the felly coöperating directly with driving-stops on the rim, substantially as described.

2. In wheels for road and other vehicles in which the rims are supported by elastic cushions on the felly, a metal band rotatably mounted between the felly and the rim and in contact with said cushions.

3. In wheels for road and other vehicles in which the rim is supported by elastic cushions on the felly a metal band rotatably mounted on the felly substantially as and for the purpose set forth.

4. In wheels for road and other vehicles, a tire consisting of a wooden rim, a pair of side rings projecting inward therefrom, a wooden felly surmounted by a metal band and adapted to slide between the said side rings, a second metal band rotatably mounted on the first metal band, elastic cushions interposed between the second band and the rim, and driving-stops on the felly coöperating with driving-stops on the rim, substantially as described.

5. A wheel for road-vehicles comprising an outer rim, side rings attached thereto, a felly adapted to slide between the side rings, a metal band rotatably mounted on the felly, elastic cushions between the said band and the rim and a plurality of driving-stops projecting outward from the felly each of which coöperates with a pair of driving-stops projecting inward from the rim, constructed substantially as herein described with reference to Figs. 1, 2 and 3 of the accompanying drawings.

In testimony whereof I have signed my name to this specification in the presence of two subscribing witnesses.

G. STUART OGILVIE.

Witnesses:
   EDWARD GARDNER,
   GEORGE HENRY HADDEN.